United States Patent
Hong et al.

(10) Patent No.: US 9,065,493 B2
(45) Date of Patent: Jun. 23, 2015

(54) METHOD AND APPARATUS FOR COORDINATED MULTI-POINT COMMUNICATION FOR EACH SUB-BAND BASED ON LONG-TERM CHANNEL STATE INFORMATION

(75) Inventors: Young Jun Hong, Seoul (KR); Bruno Clerckx, Seoul (KR); Sung Hyun Choi, Seoul (KR); Hye Won Lee, Yongin-si (KR); Hui Won Je, Gwacheon-si (KR)

(73) Assignees: Samsung Electronics Co., Ltd., Suwon-si (KR); SNU R&D Foundation, Seoul (KR)

( * ) Notice: Subject to any disclaimer, the term of this patent is extended or adjusted under 35 U.S.C. 154(b) by 165 days.

(21) Appl. No.: 13/034,836

(22) Filed: Feb. 25, 2011

(65) Prior Publication Data

US 2012/0027108 A1    Feb. 2, 2012

(30) Foreign Application Priority Data

Jul. 27, 2010  (KR) .......................... 10-2010-0072469

(51) Int. Cl.
| | |
|---|---|
| *H04W 4/00* | (2009.01) |
| *H04B 7/02* | (2006.01) |
| *H04B 7/06* | (2006.01) |
| *H04W 52/14* | (2009.01) |
| *H04W 52/40* | (2009.01) |

(52) U.S. Cl.
CPC ............... *H04B 7/024* (2013.01); *H04B 7/065* (2013.01); *H04W 52/143* (2013.01); *H04W 52/40* (2013.01)

(58) Field of Classification Search
CPC ..... H04B 7/024; H04B 7/065; H04W 52/143; H04W 52/40

USPC .......... 370/329, 280, 351–356; 455/423, 509, 455/91, 130, 450

See application file for complete search history.

(56) References Cited

U.S. PATENT DOCUMENTS

| | | | |
|---|---|---|---|
| 2004/0160943 A1 | 8/2004 | Cain | |
| 2004/0266484 A1* | 12/2004 | Kogiantis et al. | .......... 455/562.1 |
| 2005/0207350 A1 | 9/2005 | Bloebaum | |

(Continued)

FOREIGN PATENT DOCUMENTS

| | | |
|---|---|---|
| CN | 101529938 A | 9/2009 |
| EP | 1 892 971 A | 2/2008 |

(Continued)

OTHER PUBLICATIONS

International Search Report for International Application No. PCT/KR2011/005523 dated Feb. 21, 2012.

(Continued)

*Primary Examiner* — Khaled Kassim
(74) *Attorney, Agent, or Firm* — NSIP Law

(57) ABSTRACT

Provided is a coordinated communication method and apparatus that may perform coordinated communication based on long-term channel information, for each sub-band. Base stations may exchange scheduling information of each sub-band with each other to determine a priority among the base stations, and may perform rescheduling for each sub-band based on the determined priority. The base stations may obtain the long-term channel information, and thus may reduce overhead occurring with exchanging of information between a base station and a terminal or between base stations, and may decrease damage due to a delay of channel information associated with a terminal.

21 Claims, 16 Drawing Sheets

(56) References Cited

U.S. PATENT DOCUMENTS

| | | |
|---|---|---|
| 2006/0140412 A1 | 6/2006 | Villemoes et al. |
| 2007/0147487 A1* | 6/2007 | Frederiksen et al. ......... 375/222 |
| 2008/0227487 A1* | 9/2008 | Daniels et al. ............. 455/553.1 |
| 2008/0267106 A1 | 10/2008 | Buddhikot et al. |
| 2008/0268833 A1 | 10/2008 | Huang et al. |
| 2009/0023449 A1 | 1/2009 | Kim et al. |
| 2009/0103472 A1 | 4/2009 | Ni et al. |
| 2009/0141676 A1 | 6/2009 | Maheshwari et al. |
| 2009/0196203 A1* | 8/2009 | Taira et al. .................... 370/280 |
| 2009/0221290 A1 | 9/2009 | Kang et al. |
| 2009/0239524 A1* | 9/2009 | Terabe et al. ................. 455/423 |
| 2010/0285811 A1* | 11/2010 | Toda et al. ................. 455/452.1 |
| 2010/0291940 A1* | 11/2010 | Koo et al. ..................... 455/450 |
| 2010/0303029 A1* | 12/2010 | Jang ............................... 370/329 |
| 2011/0223928 A1* | 9/2011 | Seo et al. ................... 455/452.1 |
| 2012/0009967 A1* | 1/2012 | Kawasaki ..................... 455/509 |
| 2012/0021753 A1* | 1/2012 | Damnjanovic et al. ....... 455/450 |
| 2012/0087423 A1* | 4/2012 | Ko et al. ....................... 375/259 |

FOREIGN PATENT DOCUMENTS

| | | |
|---|---|---|
| EP | 2 373 109 A1 | 5/2011 |
| KR | 10-2009-0112848 | 10/2009 |
| WO | WO 2007/054872 | 5/2007 |
| WO | WO 2010/075781 A1 | 7/2010 |

OTHER PUBLICATIONS

Motorola: "CoMP Support in Rel-10:Performance with intra-eNB CoBF and Cell-edge Improvements", 3GPP Draft; R1-101130 Comp Support in Rel-10 (Final Clean), 3rd Generation Partnership Project (3GPP), Mobile Competence Centre; vol. RAN WG1 #60, XP05041867, Feb. 22-26, 2010 (11 pages, in English).

Extended European Search Report mailed Jul. 8, 2014 in counterpart European Application No. 11 81 2765 (9 pages, in English).

Chinese Office Action issued on Feb. 2, 2015, in counterpart Chinese Application No. 201180046052.7 (7 pages in English, 5 pages in Chinese).

* cited by examiner

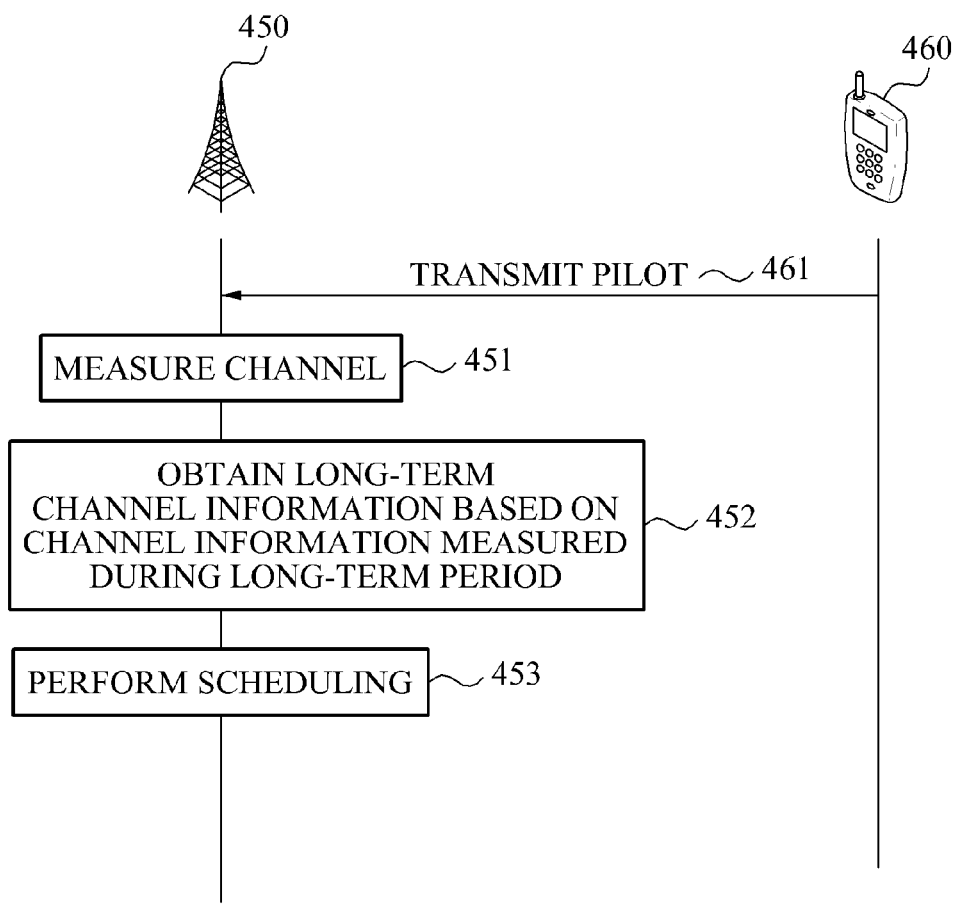

FIG. 8

| SUB-BAND INDEX | TEMPORARILY SELECTED RECEIVER GROUP | TRANSMISSION POWER | MIMO TRANSMISSION SCHEME | TRANSMISSION BEAMFORMING MATRIX | PERFORMANCE METRIC |
|---|---|---|---|---|---|
| 1 | {A,B} | 0.2 | CB | $\{F_i\}_{1,1}$ | 1.1 |
| 2 | {B} | 0.5 | sMIMO | $\{F_i\}_{1,2}$ | 3.5 |
| 3 | {A,C} | 0.3 | JP | $\{F_i\}_{1,3}$ | 2.7 |
| 4 | - | - | - | - | - |

METHOD AND APPARATUS FOR COORDINATED MULTI-POINT COMMUNICATION FOR EACH SUB-BAND BASED ON LONG-TERM CHANNEL STATE INFORMATION

CROSS-REFERENCE TO RELATED APPLICATION(S)

This application claims the benefit under 35 U.S.C. §119 (a) of Korean Patent Application No. 10-2010-0072469, filed on Jul. 27, 2010, in the Korean Intellectual Property Office, the entire disclosure of which is incorporated herein by reference for all purposes.

BACKGROUND

1. Field

The following description relates to a single-user (SU) or multi-user (MU) coordinated multiple-input multiple-output (MIMO) communication method and apparatus.

2. Description of Related Art

Mobile communication systems may use a high carrier frequency to secure sufficient frequency resources. This high carrier frequency may cause a cell coverage to decrease. There have been various attempts, such as decreasing a distance between cells, increasing a transmission power, and the like, to overcome the decrease of the cell coverage. In these attempts, users in a cell edge may experience interference from adjacent cells.

Inter-cell coordination may be used to control interference, and thus, may enhance a communication performance. However, overhead is generated by the exchanging of information for the inter-cell coordination. Accordingly, the exchanging of information for the inter-cell coordination may not be performed in real-time.

SUMMARY

In one general aspect, there is provided a communication method of a target base station in a multi-cell communication system, the communication method comprising generating scheduling information associated with the target base station by scheduling each sub-band of the target base station, transmitting scheduling information associated with the target base station to at least one neighbor base station and receiving scheduling information associated with the at least one neighbor base station, wherein the transmitting and the receiving are based on a predetermined period, and re-scheduling each sub-band based on the scheduling information associated with the target base station and based on the scheduling information associated with the at least one neighbor base station received from the at least one neighbor base station.

The communication method may further comprise obtaining long-term channel information associated with a long-term channel between the target base station and at least one target terminal served by the target base station, wherein the long-term channel information is channel information associated with a long-term period that includes at least two predetermined short-term periods, and the generating comprises generating the scheduling information associated with the target base station based on the long-term channel information.

The long-term channel information may comprise at least one of information associated with a signal to interference and noise ratio (SINR) of a wideband, information associated with a correlation coefficient matrix of a transmission antenna of the target base station and a reception antenna of the at least one target terminal, information associated with channel quality information (CQI) with respect to each sub-band and information associated with a channel direction information (CDI) with respect to each sub-band, information associated with a moving speed of the at least one target terminal, and synchronization information between the at least one neighbor base station and the target base station with respect to the at least one target terminal.

The obtaining may comprise receiving, from the at least one target terminal, the long-term channel information based on the long-term period.

The obtaining may comprise receiving, from the at least one target terminal, short-term channel information associated with a short-term channel between the target base station and the at least one target terminal, based on a short-term period, and calculating the long-term channel information based on the short-term channel information received during the long-term period.

The obtaining may comprise receiving a pilot from the at least one target terminal, and calculating the long-term channel information based on the pilot.

The generating may comprise generating the scheduling information associated with the target base station, and the scheduling information may comprise information associated with at least one of an index of each sub-band, a terminal group temporarily selected by the target base station for each sub-band, a transmission power allocated to each sub-band, a multiple-input multiple-output (MIMO) transmission scheme for the temporarily selected terminal group, transmission beamforming matrices recommended for the target base station and the at least one neighbor base station to provide a service to the temporarily selected terminal group based on the MIMO transmission scheme, and a performance metric associated with the terminal group temporarily selected for each sub-band.

The transmitting and receiving may comprise transmitting, to the at least one neighbor base station, scheduling information associated with the target base station and receiving the scheduling information associated with the at least one neighbor base station, and the transmitting and the receiving are based on the long-term period including at least two predetermined short-term periods.

The re-scheduling may comprise determining, for each sub-band, at least one of a target terminal for a service, an allocated power, a MIMO transmission scheme, and a transmission beamforming matrix, based on the scheduling information associated with the at least one neighbor base station and the scheduling information associated with the target base station.

The re-scheduling may comprise re-scheduling a leading sub-band in which a performance metric of the target base station with respect to the corresponding band is higher than a performance metric of the at least one neighbor base station, based on the scheduling information associated with the target base station, and re-scheduling a following sub-band in which a performance metric of the target base station with respect to the corresponding band is lower than the performance metric of the at least one neighbor base station, based on scheduling information associated with a neighbor base station having a highest performance metric in the following sub-band.

The re-scheduling based on the scheduling information that is associated with the neighbor base station having the highest performance metric may comprise re-scheduling the following sub-band based on the scheduling information associated with the target base station, when a MIMO transmission scheme of the neighbor base station having the highest performance metric is a single cell MIMO transmission scheme.

The re-scheduling based on the scheduling information that is associated with the neighbor base station having the highest performance metric may comprise selecting a target terminal for a service in the following sub-band, based on a transmission beamforming matrix of the neighbor base station having the highest performance metric in the following sub-band, when a MIMO transmission scheme of the neighbor base station having the highest performance metric is a coordinated beamforming (CB) scheme.

The re-scheduling based on the scheduling information that is associated with the neighbor base station having the highest performance metric may comprise determining a transmission beamforming matrix in the following sub-band, based on a transmission beamforming matrix of the neighbor base station having the highest performance metric in the following sub-band, to transmit data to the terminal selected by the neighbor base station having the highest performance metric in the following sub-band, when an MIMO transmission scheme of the neighbor base station having the highest performance metric is a joint processing (JP) scheme.

The communication method may further comprise performing precoding based on a result of the re-scheduling performed with respect to each sub-band.

The communication method may further comprise updating, based on a predetermined period, the scheduling information associated with the target base station, using the long-term channel information associated with a long-term channel between the target base station and the at least one target terminal served by the target base station, wherein the long-term channel information is channel information associated with a long-term period including at least two predetermined short-term periods.

In another aspect, there is provided a target base station in a multi-cell communication system, the target base station comprising a scheduler to generate scheduling information associated with the target base station by scheduling each sub-band of the target base station, an information exchanging unit to transmit scheduling information associated with the target base station to at least one neighbor base station and to receive scheduling information associated with the at least one neighbor base station, based on a predetermined period, and a re-scheduler to re-schedule each sub-band based on the scheduling information associated with the target base station and based on scheduling information associated with the at least one neighbor base station received from the at least one neighbor base station.

The target base station may further comprise a channel information obtaining unit to obtain long-term channel information associated with a long-term channel between the target base station and at least one target terminal served by the target base station, wherein the long-term channel information is channel information associated with a long-term period including at least two predetermined short-term periods, and the scheduler generates the scheduling information associated with the target base station based on the long-term channel information.

The channel information obtaining unit may obtain the long-term channel information, and the long-term channel information may comprise at least one of information associated with a signal to interference and noise ratio (SINR) of a wideband, information associated with a correlation coefficient matrix of a transmission antenna of the target base station and a reception antenna of the at least one target terminal, information associated with channel quality information (CQI) with respect to each sub-band and information associated with a channel direction information (CDI) with respect to each sub-band, information associated with a moving speed of at least one target terminal, and synchronization information between the at least one neighbor base station and the target base station with respect to the at least one target terminal.

The scheduler may generate the scheduling information associated with the target base station, and the scheduling information may comprise information associated with at least one of an index of each of the sub-bands, a terminal group temporarily selected by the target base station for each sub-band, a transmission power allocated to each sub-band, a multiple input multiple output (MIMO) transmission scheme for the temporarily selected terminal group, transmission beamforming matrices recommended for the target base station and the at least one neighbor base station to provide a service to the temporarily selected terminal group based on the MIMO transmission scheme, and a performance metric associated with the terminal group temporarily selected for each sub-band.

The information exchanging unit may transmit, to the at least one neighbor base station, scheduling information associated with the target base station and may receive the scheduling information associated with the at least one neighbor base station, based on the long-term period including at least two predetermined short-term periods.

The re-scheduler may determine, for each sub-band, at least one of a target terminal for a service, an allocated power, a MIMO transmission scheme, and a transmission beamforming matrix, based on the scheduling information associated with the at least one neighbor base station and the scheduling information associated with the target base station.

The re-scheduler may perform re-scheduling of a leading sub-band in which a performance metric of the target base station with respect to the corresponding band is higher than a performance metric of the at least one neighbor base station, based on the scheduling information associated with the target base station, and may perform re-scheduling of a following sub-band in which the performance metric of the target base station with respect to the corresponding band is lower than the performance metric of the at least one neighbor base station, based on scheduling information associated with a neighbor base station having a highest performance metric in the following sub-band.

The target base station may further comprise a precoder to perform precoding based on a result of the re-scheduling performed with respect to each sub-band.

The scheduler may update, based on a predetermined period, the scheduling information associated with the target base station, using the long-term channel information associated with a long-term channel between the target base station and the at least one target terminal corresponding to the target base station, and the long-term channel information may be channel information associated with a long-term period including at least two predetermined short-term periods.

Other features and aspects will be apparent from the following detailed description, the drawings, and the claims.

BRIEF DESCRIPTION OF THE DRAWINGS

FIG. 4C is a flowchart illustrating another example of a method in which a target base station obtains long-term channel information.

FIG. 8 is a diagram illustrating an example of a preference table indicating scheduling information.

Figure 1:
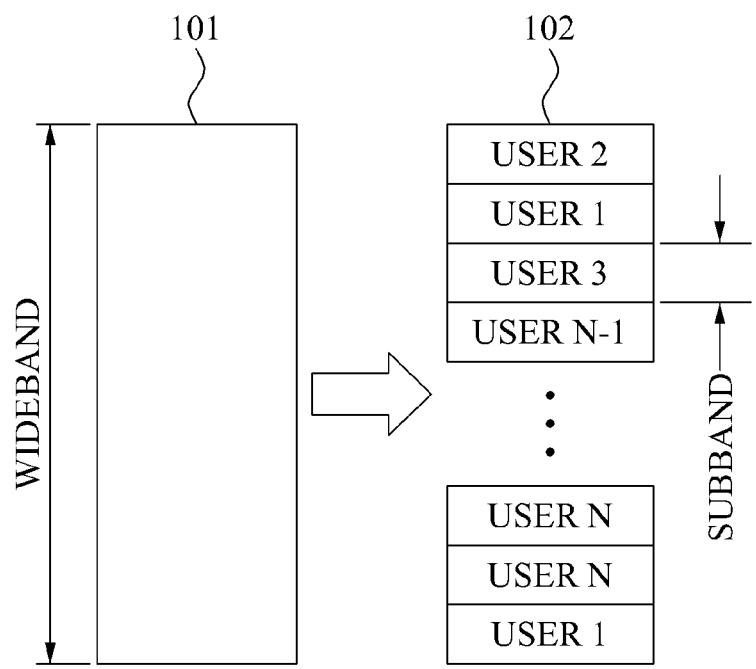
FIG. 1 is a diagram illustrating an example of a wideband divided into multiple sub-bands.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein may be suggested to those of ordinary skill in the art. Also, descriptions of well-known functions and constructions may be omitted for increased clarity and conciseness.

Examples described herein relate to a coordinated scheduling method and apparatus for coordinated multiple-input multiple-output (MIMO) transmission between multiple nodes in a cellular network.

For example, a node may correspond to a body of communication, which performs scheduling for coordinated MIMO transmission between multiple nodes. The node may determine a coordinated MIMO transmission method for coordinated MIMO transmission between multiple nodes and frequency resources to be used for the coordinated MIMO transmission, based on long-term channel information of users. In a cellular network in which a base station manages communication in a cell, a base station included in each cell may be a node.

As another example, a user may correspond to a body of communication, which is directly involved in transmission and reception of the coordinated MIMO transmission between the multiple nodes. The user may transmit, to a node, information to be used for the coordinated MIMO transmission between the multiple nodes. For example, the user may transmit MIMO channel information, and thus, may help scheduling of the coordinated MIMO transmission between multiple nodes. In the cellular network in which the base station manages communication in the cell, a terminal included in each cell may correspond to the user.

Examples described herein may be applicable to an uplink transmission, in addition to a downlink transmission. For ease of descriptions, the node is denoted by a base station and the user is denoted by a terminal. Examples are described in terms of the downlink transmission. In the downlink transmission, a transmitter is denoted by the base station and a receiver is denoted by the terminal. However, it should be appreciated that the examples may also be used in an uplink transmission, for example, in an uplink transmission in which the transmitter is a terminal and the receiver is a base station.

FIG. 1 illustrates an example of a wideband divided into multiple sub-bands.

Referring to FIG. 1, described is an example of performing scheduling for each sub-band in a communication environment in which a wideband 101 of a cellular network is divided into multiple sub-bands 102. For example, the scheduling may include determining a coordinated MIMO transmission scheme that is to be applied to a terminal, determining a transmission power to be allocated, determining a beamforming matrix to be used, and the like, for each sub-band.

Figure 2:
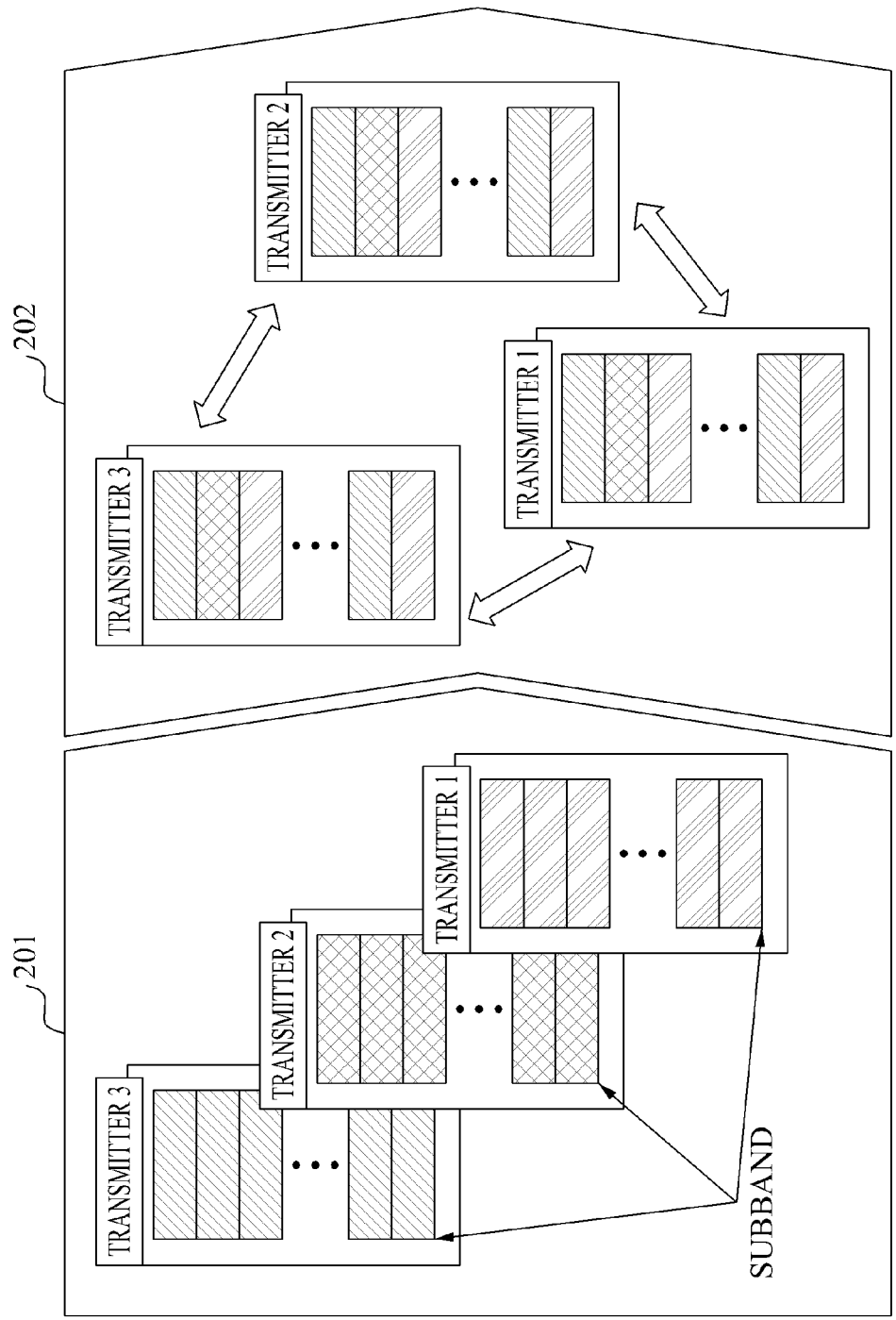
FIG. 2 is a diagram illustrating an example of a scheduling process and a rescheduling process.

FIG. 2 illustrates an example of a scheduling process and a rescheduling process.

Referring to FIG. 2, scheduling may include two operations.

In 201, base stations may perform scheduling with respect to corresponding terminals, based on channel information. For example, the channel information may be long-term channel information. The long-term channel information may correspond to channel information associated with a long-term period that includes at least two predetermined short-term periods. The scheduling may be performed for each sub-band.

In 202, scheduling between neighbor base stations may be adjusted based on a scheduling result of each base station. In 201, the base stations may exchange information associated with the scheduling result, and may perform coordinated scheduling between base stations based on information associated with the exchanged scheduling result. Scheduling may then be performed again. The adjusting of the scheduling between the base stations may be separately performed for each sub-band.

Figure 3:
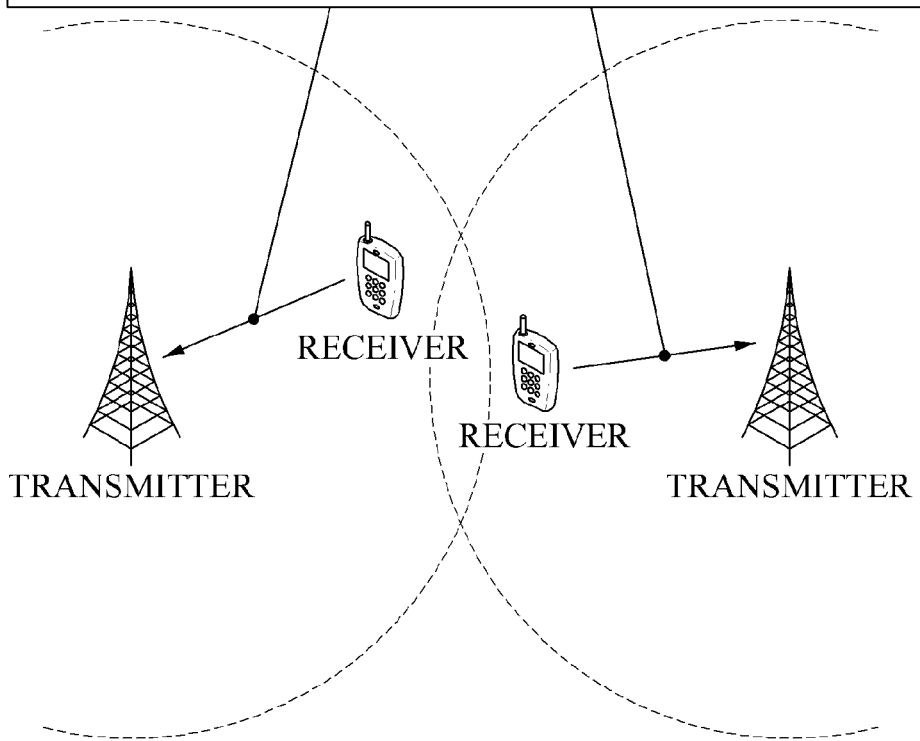
FIG. 3 is a diagram illustrating an example of contents of long-term channel information and a process in which base stations obtain the long-term channel information.

FIG. 3 illustrates an example of contents of long-term channel information and a process in which base stations obtain the long-term channel information.

Referring to FIG. 3, in this example the base stations obtain channel information associated with corresponding terminals to perform scheduling.

For example, the channel information obtained by a target base station may include 1) information associated with a signal to interference and noise ratio (SINR) of a wideband, 2) information associated with a correlation coefficient matrix of a transmission antenna of the target base station and a reception antenna of at least one target terminal, 3) information associated with channel quality information (CQI) with respect to each of the sub-bands and information associated with a channel direction information (CDI) with respect to each of the sub-bands, 4) information associated with a moving speed of at least one target terminal, and 5) synchronization information between the target base station with respect to the at least one target terminal and the at least one neighbor base station. For example, the synchronization information may be with respect to time, frequency, and/or phase. In this example, each of the contents of the channel information may include information associated with the target base station and information associated with a neighbor base station.

In an uplink transmission, the content of the channel information may be changed to be suitable for the uplink transmission. For example, the synchronization information associated with the base stations may be replaced with synchronization information associated with terminals. In the uplink transmission, the channel information may include preference scheduling information associated with each terminal.

In this example, channel information that has relatively little change in time may be obtained based on a long-term period, to reduce overhead of radio resources used for obtaining the channel information and to minimize a damage when obtaining the channel information is delayed. For example, the base stations may obtain long-term channel information.

Hereinafter, three examples of a method of obtaining the long-term channel information are described.

Figure 4A:
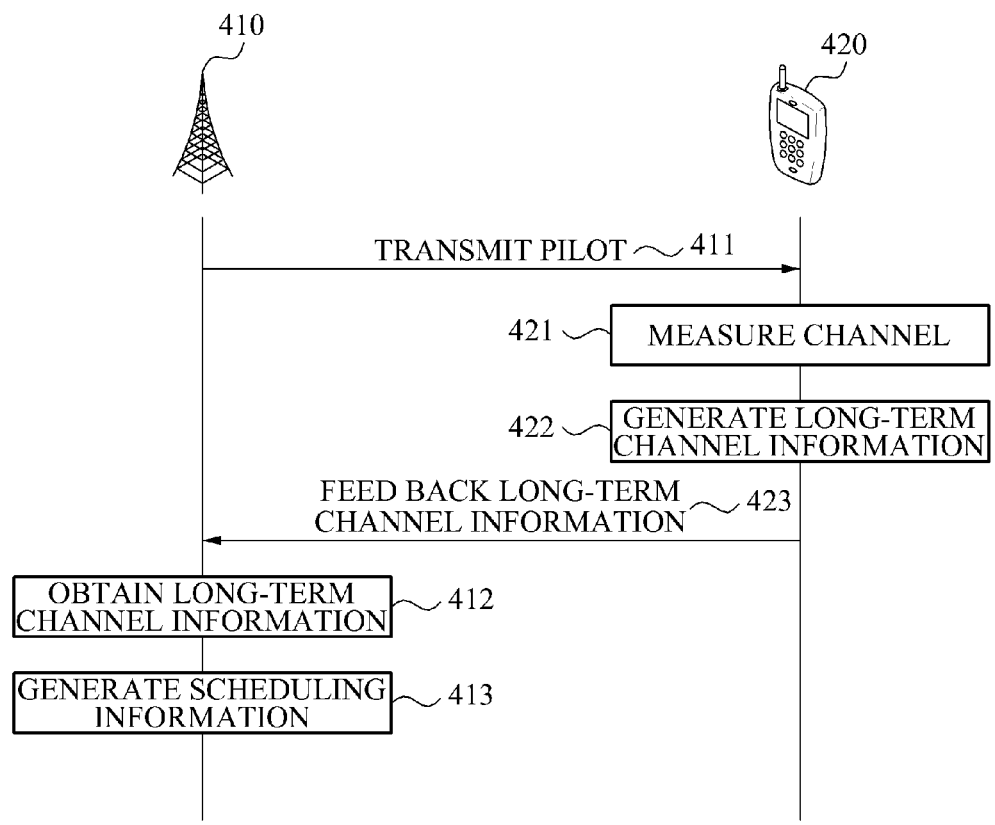
FIG. 4A is a flowchart illustrating an example of a method in which a target base station obtains long-term channel information.

FIG. 4A illustrates an example of a method in which a target base station obtains long-term channel information.

Referring to FIG. 4A, a target base station 410 transmits a pilot to a target terminal 420, in 411. The target terminal 420 measures a channel between the target base station 410 and the target terminal 420 based on the transmitted pilot, in 421. For example, the channel information associated with the measured channel may be short-term channel information. The target terminal 420 may collect short-term channel information during a long-term period.

In 422, the target terminal 420 generates long-term channel information based on the short-term channel information collected during the long-term period. The target terminal 420 transmits or feeds back the long-term channel information to the target base station 410, in 423. The target base station 410 obtains the long-term channel information, in 412. The target base station 410 performs scheduling based on the long-term channel and generates scheduling information, in 413. This method may be applicable to a downlink transmission of a frequency division duplexing (FDD) system.

Figure 4B:
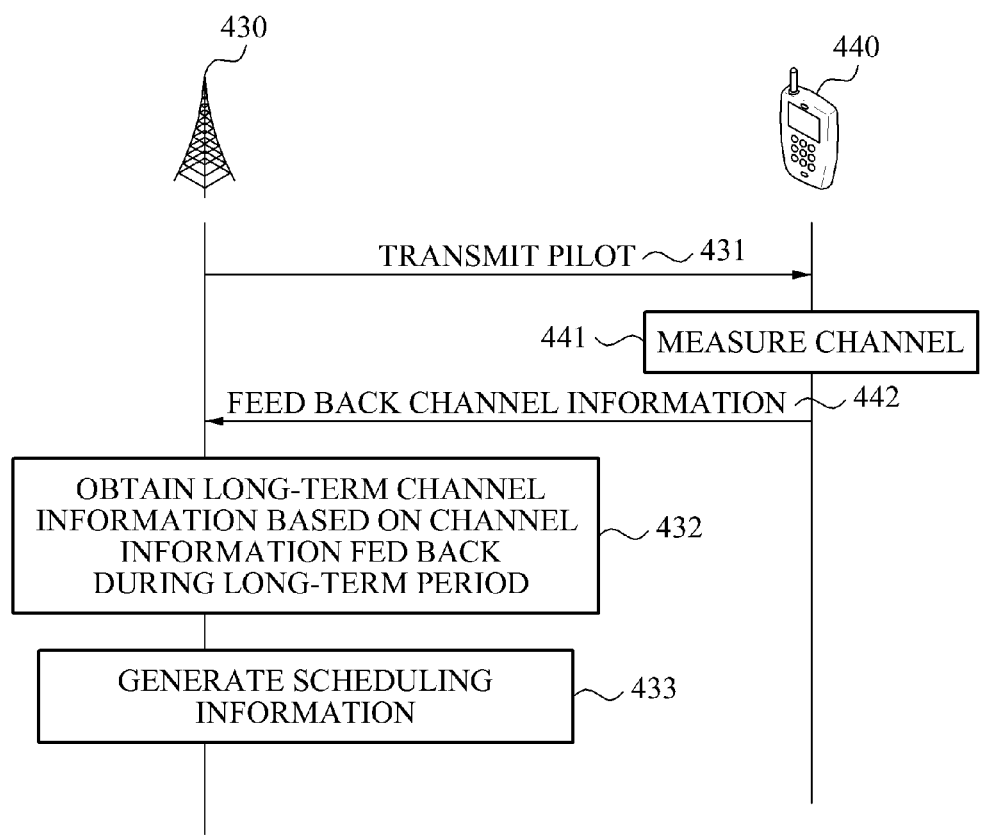
FIG. 4B is a flowchart illustrating another example of a method in which a target base station obtains long-term channel information.

FIG. 4B illustrates another example of a method in which a target base station obtains long-term channel information.

Referring to FIG. 4B, a target base station 430 transmits a pilot to a target terminal 440, in 431. The target terminal 440 measures a channel between the target base station 430 and the target terminal 440 based on the transmitted pilot, in 441. For example, the channel information associated with the measured channel may be short-term channel information.

In 442, the target terminal 440 transmits or feeds back the channel information to the target base station 430 based on a short-term period. The target base station 430 obtains long-term channel information by calculating the long-term channel information based on the short-term channel information received during a long-term period from the target terminal 440, in 432. The target base station 430 performs scheduling based on the long-term channel information and generates scheduling information, in 433. For example, this method may be applicable to a downlink transmission of an FDD system.

FIG. 4C illustrates another example of a method in which a target base station obtains long-term channel information.

Referring to FIG. 4C, a target terminal 460 transmits a pilot to a target base station 450, in 461. In 451, the target base station 450 measures a channel between the target base station 450 and the target terminal 460, based on the transmitted pilot. For example, channel information associated with the measured channel may be short-term channel information. The target base station 450 obtains long-term channel information by calculating the long-term channel information based on the channel information measured during a long-term period, in 452. The target base station 450 performs scheduling based on the long-term channel information and generates scheduling information, in 453. In this example, a channel extending from the target base station 450 to the target terminal 460 may be similar to a channel extending from the target terminal 460 to the target base station 450. This method may be applicable to a downlink transmission or an uplink transmission of a time division duplexing (TDD) system.

The examples described with reference to FIGS. 4A, 4B, and 4C may be applicable to obtaining channel information associated with a channel between a neighbor base station and a target terminal. When the pilot is transmitted from the neighbor base station, as opposed to the target base station, the target base station may obtain channel information associated with the neighbor base station.

Figure 5:
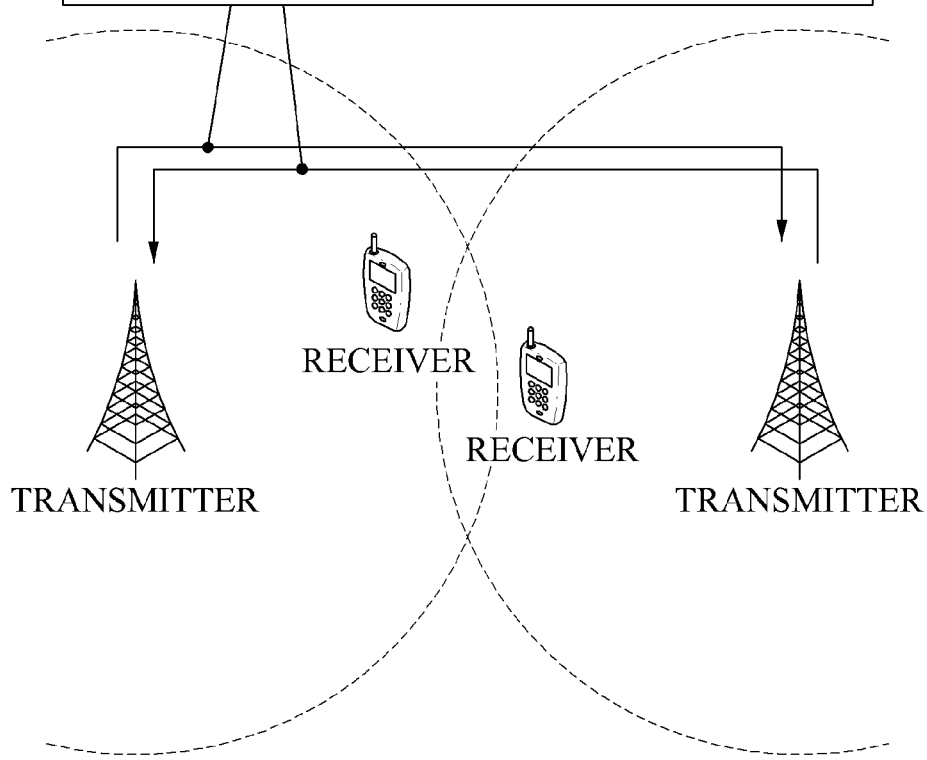
FIG. 5 is a diagram illustrating an example of contents of scheduling information and a process in which base stations exchange scheduling information.

FIG. 5 illustrates an example of contents of scheduling information and a process in which base stations exchange scheduling information.

A target base station may perform scheduling with respect to each sub-band based on long-term channel information, and may generate scheduling information that is associated with the target base station. The target base station may exchange the generated scheduling information with a neighbor base station. For example, the target base station may transmit the scheduling information associated with the target base station to the neighbor base station. The target base station may receive scheduling information associated with the neighbor base station, from the neighbor base station.

For example, the exchanging of the scheduling information may be performed based on a predetermined period. The target base station may transmit, to at least one neighbor base station, scheduling information associated with the target base station. The target base station may receive, from the at least one neighbor base station, scheduling information associated with the at least one neighbor base station, based on a long-term period that includes at least two predetermined short-term periods. The period for exchanging of the scheduling information may not be the same as a period for obtaining the long-term channel information.

The scheduling information associated with the target base station may include 1) an index of each sub-band, 2) a terminal group temporarily selected by the target base station for each sub-band, 3) a transmission power allocated to each sub-band, 4) a multiple-input multiple-output (MIMO) transmission scheme for the temporarily selected terminal group, 5) transmission beamforming matrices recommended for the target base station and the at least one neighbor base station to provide a service to the temporarily selected terminal group based on the MIMO transmission scheme, and 6) a performance metric associated with the terminal group temporarily selected for each sub-band. For example, the MIMO transmission scheme may include a coordinated MIMO transmission with a neighbor base station. The scheduling information associated with the target base station may be organized as shown in the table of FIG. 5, which may be referred to as a preference table.

In an uplink transmission, content of the scheduling information may be changed to be suitable for the uplink transmission. For example, '4) the MIMO transmission scheme of a base station' may be changed into a MIMO transmission scheme of a terminal, and '5) the transmission beamforming matrices of the base station' may be changed into reception beamforming matrices of the base station or transmission beamforming matrices of the terminal.

A method of generating the scheduling information included in the preference table is described.

Determining Transmission Power and MIMO Transmission Scheme

For example, the target base station may determine a transmission power and a MIMO transmission scheme suitable for each terminal, based on 1) information associated with SINR of a wideband, 2) information associated with a correlation coefficient of a transmission antenna of the target base station and a reception antenna of at least one target terminal, 3) information associated with a moving speed of the at least one target terminal, and/or 4) long-term channel information, for example, synchronization information between at least one neighbor base station and the target base station with respect to the at least one target terminal.

For example, the target base station may select, based on the SINR of the wideband, the MIMO transmission scheme for each terminal from among various MIMO transmission schemes. For example, the various schemes may include a single cell MIMO transmission scheme, a coordinated beamforming (CB) scheme, a joint processing (JP) scheme, a joint transmission (JT) scheme, a cooperative silencing scheme, a dynamic/fast cell selection scheme, and a cooperative relaying scheme, and the like.

Figure 6:
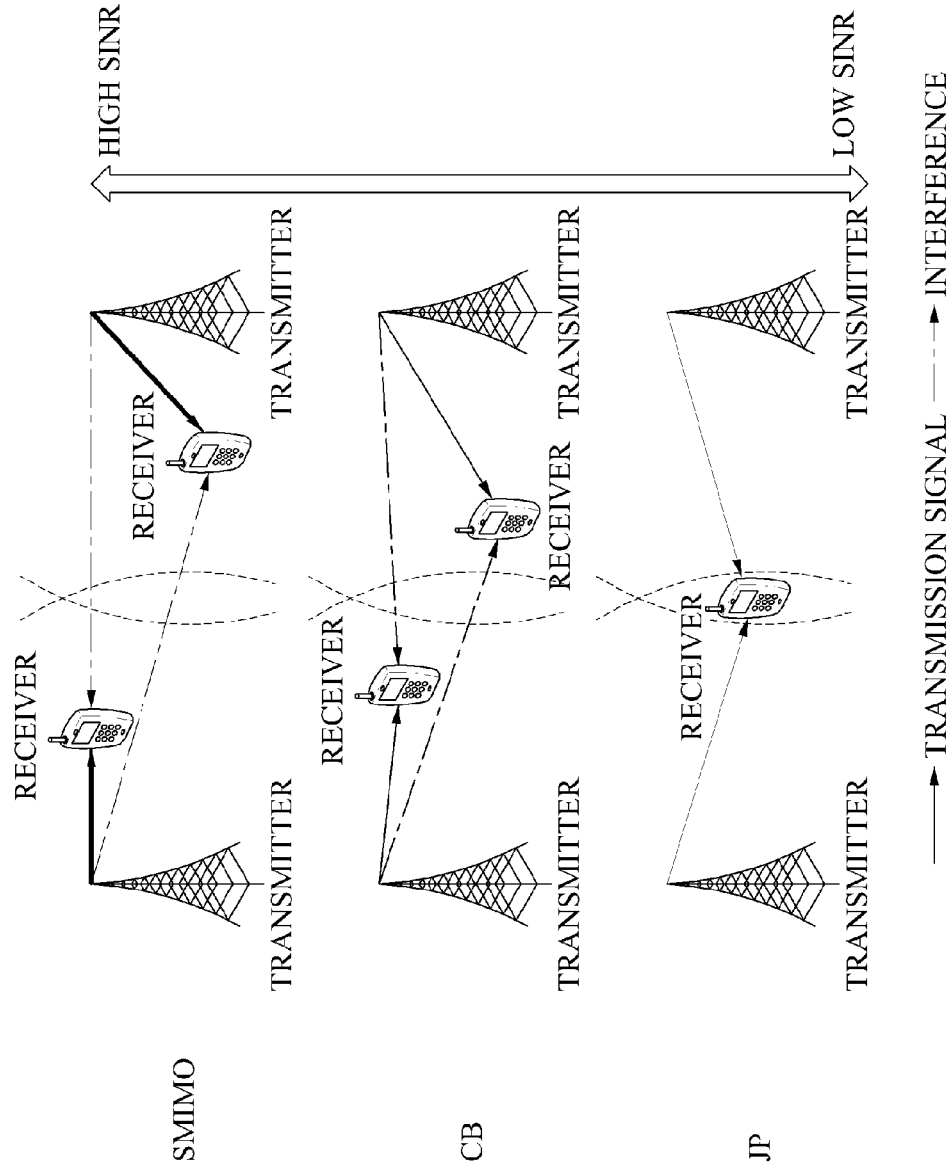
FIG. 6 is a diagram illustrating an example of determining a multiple-input multiple-output (MIMO) transmission scheme during a scheduling process.

FIG. 6 illustrates an example of a method of determining a MIMO transmission scheme during a scheduling process.

The target base station may divide a range of SINRs of terminals into multiple areas, for example, three areas. The target base station may sequentially allocate a scheme to each area, for example, a single cell MIMO transmission scheme, a CB scheme, and a JP scheme to the areas in an order from an area having a highest SINR to an area having a lowest SINR. The target base station may determine a MIMO transmission scheme of an area corresponding to an SINR for each terminal, as an MIMO transmission scheme of a corresponding terminal.

When the SINR is high, a terminal receives little interference from a neighbor base station, and thus, the target base station may perform the single cell MIMO transmission without inter-cell coordination. When the SINR is medium, a strength of a transmission signal is similar to a strength of interference, and thus, the target base station may perform the CB scheme with the neighbor base station. When the SINR is low, the target base station receives great interference from the neighbor base station, and thus, the target base station may perform the JP scheme by sharing data with the neighbor base station.

As another example, whether terminals simultaneously receive signals from the target base station and from the neighbor base station may be determined based on the synchronization information between the target base station and the neighbor base station. For example, the target base station may allocate the JP scheme, the JT scheme, and the CB scheme to the terminals, when the terminals are determined to simultaneously receive the signals from the target base station and from the neighbor base station. As another example, the target base station may allocate the single cell MIMO transmission scheme to the terminals, when the terminals are determined not to simultaneously receive the signals from the target base station and from the neighbor base station.

When the MIMO transmission scheme is determined, a cooperative relaying between terminals may be used. In this example, long-term channel information may be utilized. In an uplink transmission, the long-term channel information may be utilized to determine a coordinated transmission and reception end or to determine the MIMO transmission scheme, in the same manner as a downlink transmission.

Determining Beamforming Matrix for Each Sub-Band

The target base station may calculate a transmission beamforming matrix recommended for each sub-band of each terminal, based on the determined MIMO transmission scheme and information associated with CQI and/or CDI with respect to each sub-band of each user. For example, the calculated transmission beamforming matrices may include a transmission beamforming matrix of the target base station and transmission beamforming matrices recommended for neighbor base stations. The target base station may generate the transmission beamforming matrices recommended for the target bases station and the neighbor base stations to provide a service to a corresponding terminal based on the determined MIMO transmission scheme.

Figure 7:
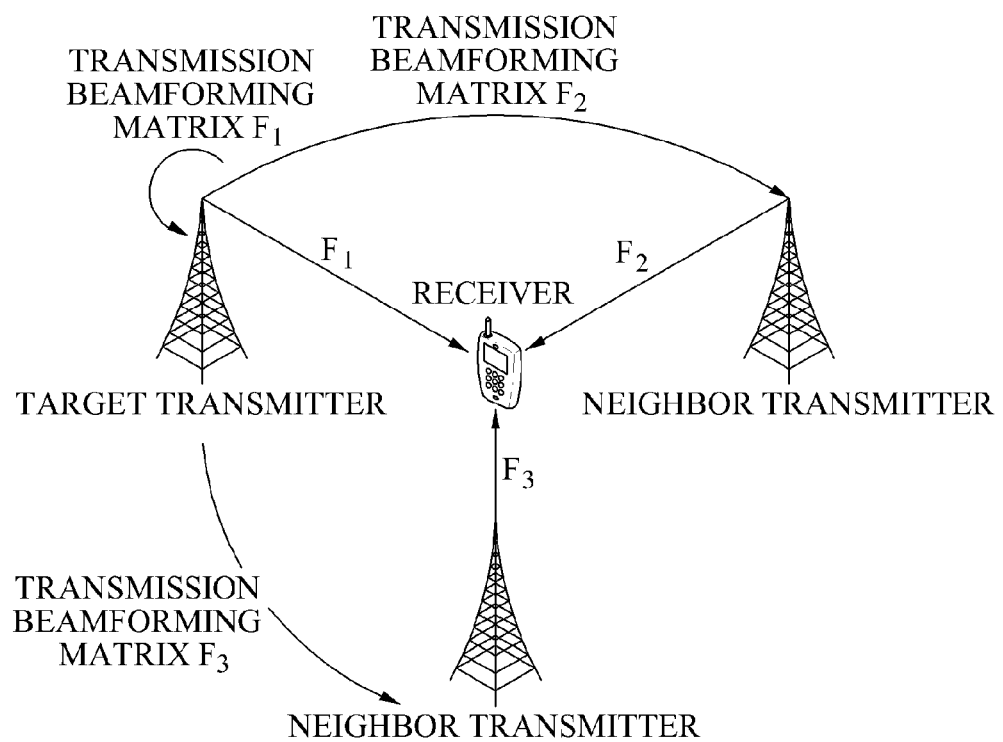
FIG. 7 is a diagram illustrating an example of a process in which neighbor base stations perform beamforming based on beamforming matrices calculated by a target base station.

FIG. 7 illustrates an example in which neighbor base stations perform beamforming based on beamforming matrices calculated by a target base station.

Referring to FIG. 7, a transmission beamforming matrix recommended for the target base station to provide a service to a terminal is denoted by F1, and transmission beamforming matrices recommended for the neighbor base stations are denoted by F2 and F3, respectively. The target base station may generate information associated with F1, F2, and F3, and may transmit F2 and F3 to corresponding neighbor base station. When the target base station is a leading base station in a corresponding sub-band, the neighbor base stations may use F2 and F3, respectively.

The target base station may calculate a performance metric for each sub-band based on, for example, a MIMO transmission scheme determined for each terminal, information associated with CQI and CDI with respect to each sub-band of each terminal, and a beamforming matrix recommended for each base station. Examples of the performance metric may include an expected throughput, a proportional fairness, and the like.

Selecting Terminal Group and Writing Sub-Band Preference Table

The target base station may select a terminal group based on the performance metric calculated for each sub-band of each terminal, and may write the sub-band preference table. For example, a terminal group that has the most suitable performance metric in each sub-band may be temporarily allocated to a corresponding sub-band.

In this example, the target base station allocates a terminal for each sub-band. It should also be understood that the base station may allocate a terminal group for each sub-band based on multi-terminal information. As another example, a transmission power may be differentially allocated for each sub-band to enhance the performance metric. Therefore, the target base station may not allocate any resource to a predetermined sub-band.

For example, the base station may allocate a terminal group and a transmission power for each sub-band, may determine a MIMO transmission scheme of a corresponding user group and transmission beamforming matrices recommended for neighbor base stations, and may calculate a performance metric, and thus, scheduling may be performed. For example, the target base station may write a preference table based on the result of the scheduling as illustrated in FIG. 8.

FIG. 8 illustrates an example of a preference table indicating scheduling information.

Referring to FIG. 8, columns in the preference table respectively indicate a sub-band index, a corresponding temporary terminal group, a transmission power allocated to a corresponding sub-band, a MIMO transmission scheme for a terminal allocated to the corresponding sub-band, transmission beamforming matrices recommended for a target base station and a neighbor base station, and a performance metric of the corresponding sub-band. Each of rows in the preference table indicates a sub-band.

In a sub-band 1, A and B are selected as terminals, a transmission power of 0.2 is allocated, a CB scheme is determined as the MIMO transmission scheme, $\{Fi\}_{1,1}$ is recommended as the transmission beamforming matrix, and a performance metric of the sub-band 1 is 1.1.

In this example, Fi corresponds to a transmission beamforming matrix of a base station i. N satisfies $1 \leq i \leq N$, and denotes a total number of base stations joining a coordinated MIMO transmission. $\{Fi\}_{j,k}$ denotes a set of transmission beamforming matrices recommended for the base station i in a $k^{th}$ sub-band of a base station j. sMIMO denotes a single cell MIMO transmission scheme. CB and JP have been described with reference to FIG. 6.

Exchanging Scheduling Information (Preference Table) Between Base Stations

When each of the base stations performs scheduling and writes a preference table, base stations may exchange scheduling information with each other. Therefore, each base station may obtain information associated with a terminal group temporarily allocated to each sub-band by other base stations For example, each base station may obtain a transmission power, a MIMO transmission scheme of a corresponding terminal group, a transmission beamforming matrix, a performance metric, and the like, of each sub-band.

Figure 9:
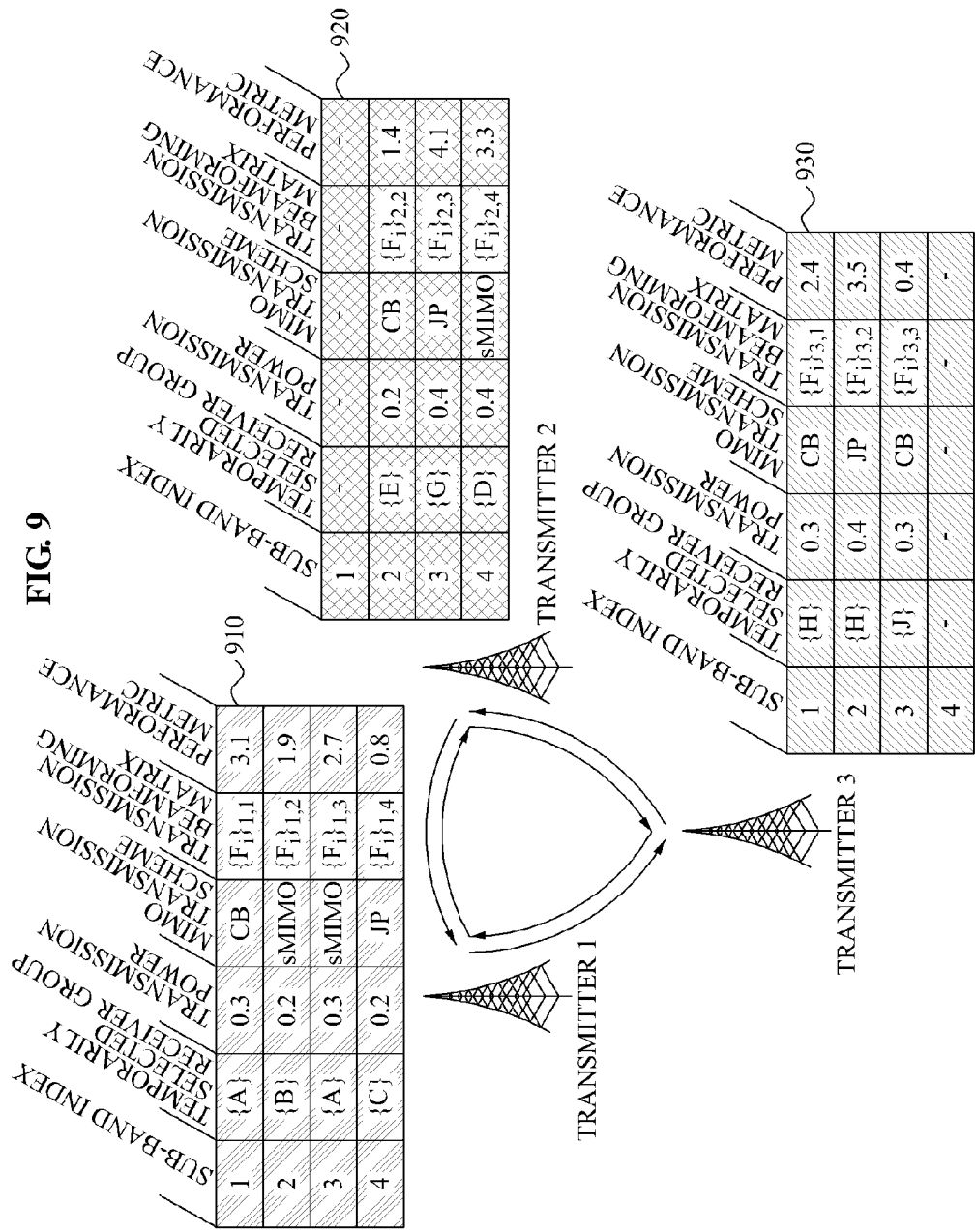
FIG. 9 is a diagram illustrating examples of preference tables of three scheduled base stations.

FIG. 9 illustrates examples of preference tables of three scheduled base stations.

Referring to FIG. 9, preference table 910 corresponds to a base station 1, a preference table 920 corresponds to a base station 2, and a preference table 930 corresponds to a base station 3. Referring to the preference table 920, a row corresponding to a sub-band 1 is blank, which means that the base station 2 does not allocate any resource to the sub-band 1. In the same manner, referring to the preference table 930, the base station 3 does not allocate any resource to a sub-band 4.

Determining Priority for Each Sub-Band and Rescheduling

When the preference table (scheduling information) is exchanged, each of the base stations may perform rescheduling with respect to each sub-band based on the exchanged scheduling information.

For example, the base stations may collect preference tables of other base stations, may determine, for each sub-band, a terminal group to be a target of an MIMO transmission, and may allocate a transmission power. When a terminal group is determined for a predetermined sub-band, a terminal group that has the most suitable performance metric may be selected from among terminal groups temporarily allocated to the corresponding sub-band.

In this example, a base station provides the terminal group having the most suitable performance metric in the corresponding sub-band as a leading base station of the corresponding sub-band The leading base station may have a priority of determining a coordinated MIMO transmission scheme with respect to frequency resources of the corresponding sub-band. In the corresponding sub-band, other base stations may be determined as following base stations. The leading base station may restrict transmission power of the following base stations to protect the terminal group. An example of determining a leading base station for each sub-band is described with reference to FIG. 10.

Figure 10:
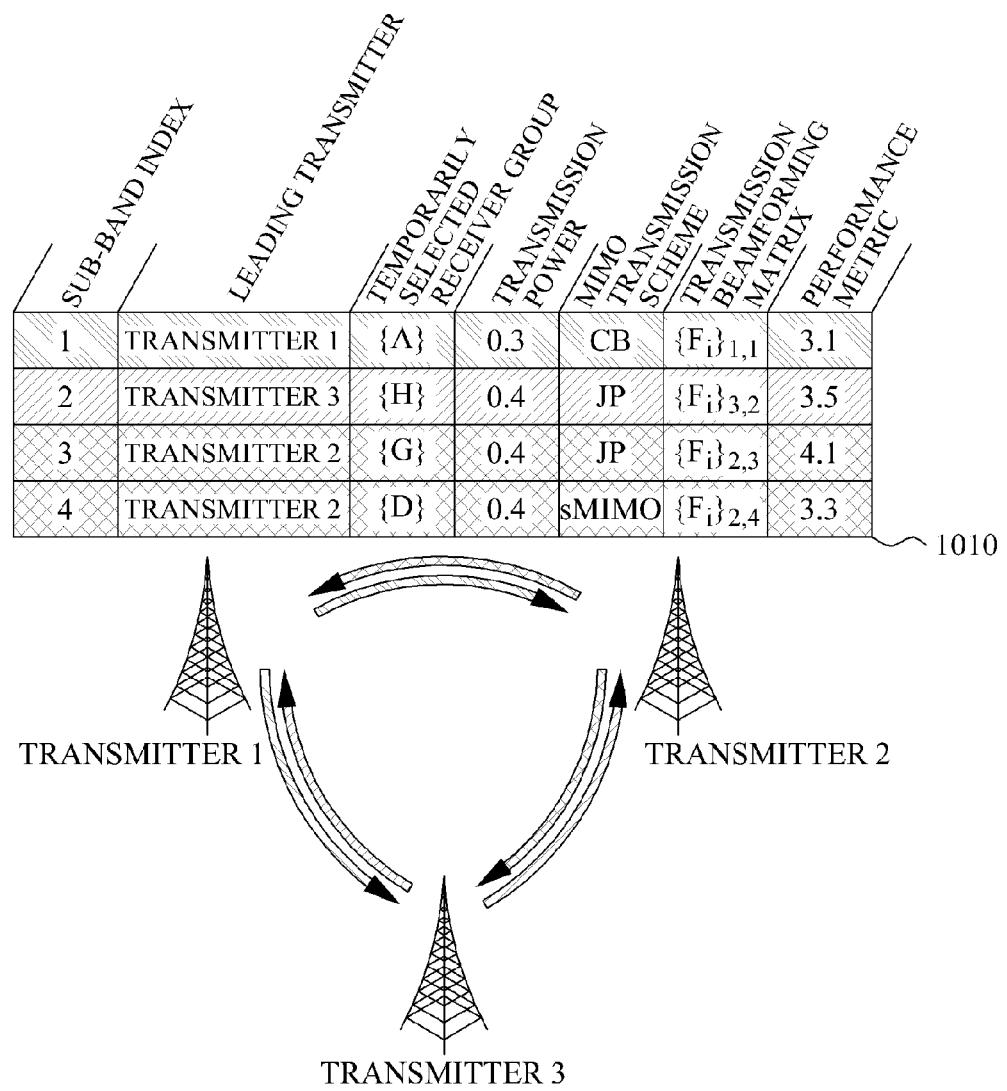
FIG. 10 is a diagram illustrating an example of determining a leading base station based on a result of exchanging the preference tables of FIG. 9.

FIG. 10 illustrates an example of determining a leading base station based on a result of exchanging preference tables of FIG. 9.

Referring to FIG. 10, a leading base station table 1010 illustrates a leading base station for each sub-band. The leading base station table 1010 is generated based on the result of the exchanging the preference tables of the three base stations.

The leading base station table 1010 may be in a form similar to a preference table. A column indicating a leading base station of a corresponding sub-band band is added next to a column for a sub-band index.

Referring to FIG. 10, a leading base station with respect to a sub-band 1 is base station 1. Referring to the preference tables of the base stations of FIG. 9, the base station 1 is a base station that has the highest performance metric in the sub-band 1: the base station 1=3.1, a base station 2=0, and a base station 3=2.4. In this manner, when the preference tables are compared with each other, a result of the comparisons may be organized as shown in the leading base station table 1010.

When a priority (the leading base station and following base stations) is determined for a sub-band, each of the base stations may perform re-scheduling for each sub-band based on the determined priority for each sub-band. For example, the base stations may determine a terminal group for a service for each sub-band, an allocated power, a MIMO transmission scheme, and transmission beamforming matrices.

A following base station of the corresponding sub-band may take the coordinated MIMO transmission scheme of the leading base station that provides a service to a terminal group decidedly allocated to the corresponding sub-band. The following base station may determine a coordinated MIMO transmission scheme and a transmission beamforming matrix to be used for the coordinated MIMO transmission, based on the preference table of the leading base station.

Based on the coordinated MIMO transmission scheme for the terminal group that is determined by the leading base station as the terminal group for the service in the corresponding sub-band, the following base station may re-allocate terminals for service in the corresponding sub-band. In this example, the terminal group selected by the leading base station may receive interference due to the coordinated MIMO transmission of the re-allocated terminals, and thus, the following base station may dynamically re-allocate the terminals to reduce interference.

In this example, the channel information of the terminal group to be used for the re-allocating may not be limited to long-term channel information. For example, a target base station may use short-term channel information associated with target terminals and/or long-term channel information associated with neighbor terminals corresponding to neighbor base stations.

An example of a terminal re-allocating method of a following base station in a communication system where various coordinated MIMO transmission scheme are used, is described with reference to FIG. 11.

Figure 11:
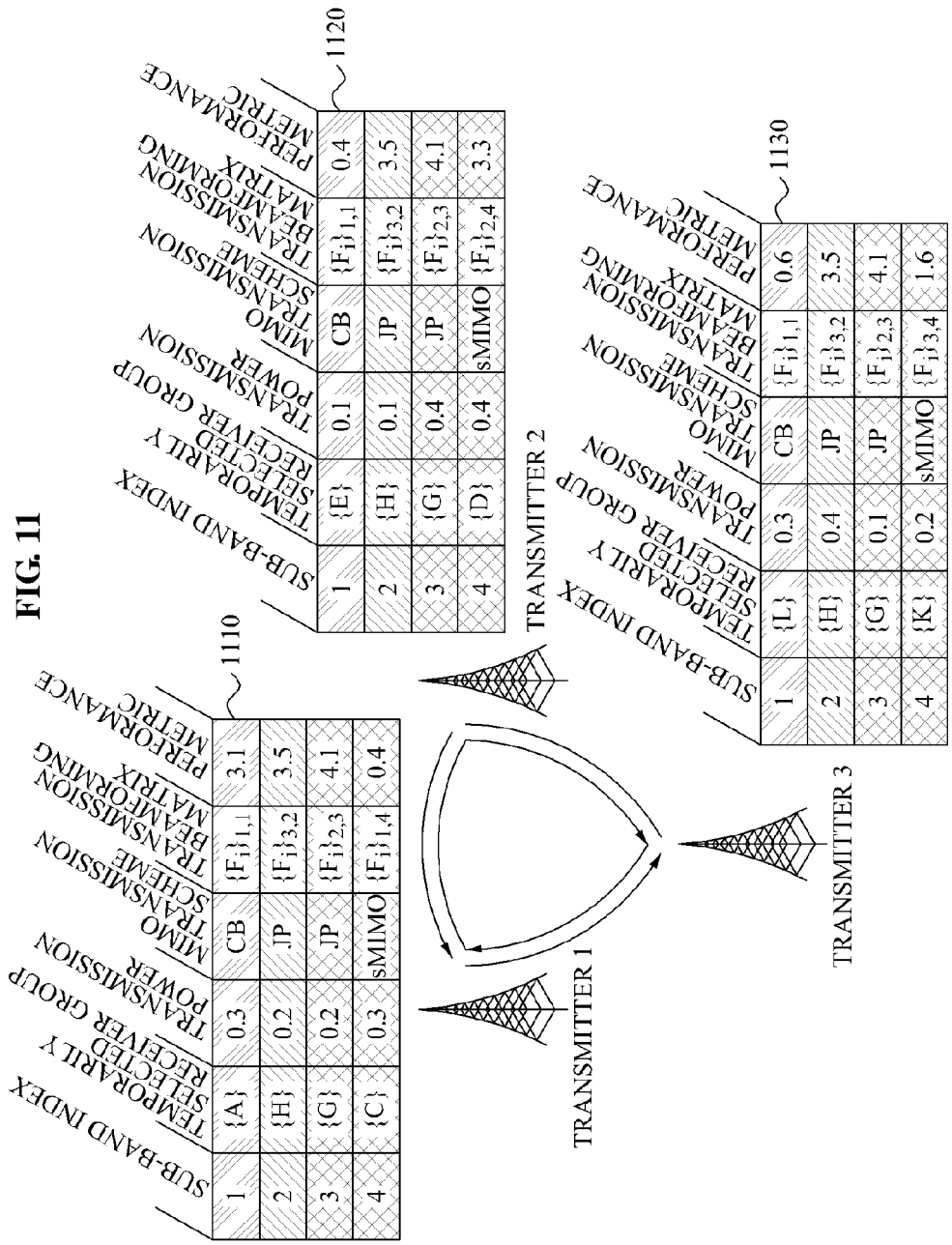
FIG. 11 is a diagram illustrating an example of rescheduling based on the determined leading base station of FIG. 10.

FIG. 11 illustrates an example of rescheduling based on the determined leading base station of FIG. 10.

Referring to FIG. 11, a base station 1, a base station 2, and a base station 3 are re-scheduled based on the determined leading base station of FIG. 10. The results of the rescheduling are organized in rescheduling tables 1110, 1120, and 1130, respectively.

A MIMO transmission scheme of the base stations is described based on the re-scheduling tables 1110, 1120, and 1130.

1) An example in which the MIMO transmission scheme of the leading base station is a single cell MIMO transmission scheme.

Following base stations may use the single cell MIMO transmission scheme.

A sub-band 4 of FIG. 11 corresponds to this example. In this example, the leading base station with respect to the sub-band 4 is a base station 2, and the following base stations with respect to the sub-band 4, namely, a base station 1 and a base station 3, may respectively select suitable terminals, and thus, may use the single cell MIMO transmission scheme.

2) An example in which the MIMO transmission scheme of the leading base station is a CB scheme.

The following base stations refer to transmission beamforming matrices calculated and advertised by the leading base station. Each of the following base stations may re-allocate, to a corresponding sub-band, a terminal that has the most suitable performance metric for the transmission beamforming matrix calculated and advertised by the leading base station from among terminals corresponding to a corresponding following base station. Therefore, the following base stations may join the CB as per the determination of the leading base station.

A sub-band 1 of FIG. 11 corresponds to this example. In this example, a leading base station of the sub-band 1 is the base station 1 and the MIMO transmission scheme of the base station in the sub-band 1 is the CB. Therefore, the base station 2 and the base station 3 may select terminals suitable for transmission beamforming matrices $\{F2\}_{1,1}$ and $\{F3\}_{1,1}$ advertised by the base station 1, and may allocate the selected terminals to the sub-band 1.

3) An example in which the MIMO transmission scheme of the leading base station is a JP scheme.

The following base stations may transmit data to terminals determined by the leading base station based on transmission beamforming matrices advertised by the leading base station, and thus, the following base stations may join the JP scheme.

A sub-band 2 and a sub-band 3 of FIG. 11 correspond to this example. For example, a leading base station with respect to the sub-band 2 is a base station 3 and a leading base station with respect to the sub-band 3 is a base station 2. In terms of the sub-band 2, the base station 1 and the base station 2 may respectively perform JP to a terminal G (not shown) that is determined by the base station 3 that is the leading base station, using transmission beamforming matrices $\{F1\}_{3,2}$ and $\{F2\}_{3,2}$ which are determined by the base station 3.

4) An example in which the MIMO transmission scheme of the leading base station is a cooperative silencing scheme.

The following base stations may not perform data transmission based on a notification of the leading base station, and thus, the following base stations may join the coordinated communication for users determined by the leading base station.

5) An example in which the MIMO transmission scheme of the leading base station is a dynamic/fast cell selection scheme.

The following base stations may change a state of data transmission instantaneously for terminals determined by the leading base station, based on a determination of the leading base station, and thus, the following base stations may join the coordinated communication.

For example, a beamforming may be performed using long-term channel information and short-term channel information together.

When a priority of using frequency resources is determined after exchanging sub-band preference tables, and the transmission power and coordinated MIMO transmission scheme are determined by the leading base station, each of the base stations may re-select a transmission beamforming matrix and a terminal group for a service. A time scale of the described operations is illustrated in FIG. 12.

Figure 12:
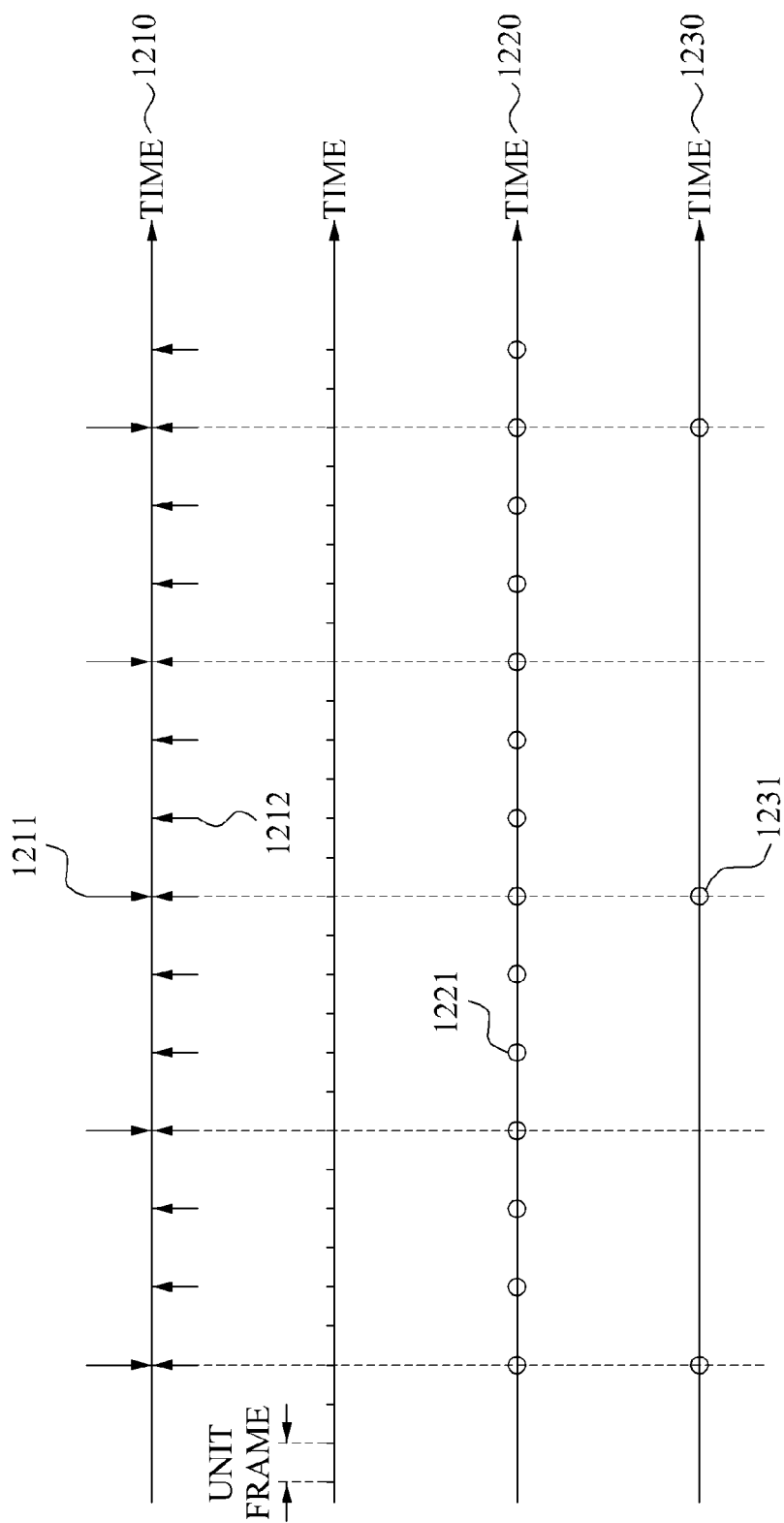
FIG. 12 is a diagram illustrating an example of a period for scheduling and rescheduling of a target base station, based on a time.

FIG. 12 illustrates an example of a period for scheduling and rescheduling of a target base station, based on a time.

Referring to FIG. 12, a scale line 1210 denotes a period for obtaining long-term channel information and a period for obtaining short-term channel information. An arrow 1211 denotes a point in time for obtaining the long-term channel information, and an arrow 1212 denotes a short-term channel information obtaining period for obtaining the short-term channel information. For example, the short-term channel information obtaining period may include two unit frames. For example, the long-term channel information obtaining period may include three short-term channel information obtaining periods. It should be appreciated that the ratio of the long-term channel information obtaining period to the short-term channel information obtaining period may be changed. The long-term channel information may not always be periodically obtained, and may be aperiodically obtained when a change occurs.

A scale line 1220 and a scale line 1230 denote periods in which a target base station performs re-scheduling based on exchanged information.

The scale line 1230 denotes a period in which the target base station determines a priority (leading base station) based on exchanged scheduling information. A point 1231 denotes a point in time in which the target base station determines the priority (leading base station) based on the exchanged scheduling information. As illustrated in FIG. 12, the long-term channel information and the short-term channel information may be used together to determine the priority. For example, the period for determining the priority may be dynamically adjusted, and does not need to be the same as the long-term channel information obtaining period or the short-term channel information obtaining period.

The scale line 1220 denotes a period in which the target base station re-selects a transmission beamforming matrix and a terminal group, based on the priority (leading base station). A point 1221 denotes a point in time for re-selecting the transmission beamforming matrix and the terminal group. The period for re-selecting the transmission beamforming matrix and the terminal group does not need to be the same as the long-term channel information period or the short-term channel information obtaining period. The long-term channel information and the short-term channel information may be used together to re-select the beamforming matrix and the terminal group.

First, the target base station may use short-term channel information associated with target terminals corresponding to the target base station and may use long-term channel information associated with neighbor terminals corresponding to neighbor base stations. Accordingly, when channel information exchanging between base stations is delayed because of a network communication environment or a change in a channel is significantly fast due to a mobility of terminals, deterioration in the coordinated MIMO transmission caused by using incorrect channel information may be reduced.

Second, when little delay exists in a network between base stations and a burden of exchanging information is not heavy, the target base station may refer to all short-term channel information of the neighbor base stations, and thus, may enhance an efficiency of the coordinated MIMO transmission. When the channel information is used in this manner, it may be desirable to use the JP scheme.

Third, when short-term channel information is rarely available because the mobility of users is significantly high or when it is difficult using short-term channel information in real-time because a number of terminals corresponding to each base station is significantly high, channel information associated with neighbor base station and channel information associated with the target base station may be the long-term channel information. Therefore, feedback overhead of channel information may be reduced, and deterioration in performance of the MIMO transmission due to a mobility of a user may be prevented.

When the transmission beamforming matrix and the terminal group are re-selected, the long-term channel information and the short-term channel information may be used together in a communication environment that uses various coordinated MIMO transmission schemes, such as a single cell MIMO transmission scheme, a CB scheme, a JP scheme, a JT scheme, a coordinated silencing scheme, a dynamic/fast selection scheme, a cooperative relaying scheme, and the like.

Examples of using the long-term channel information and the short-term channel information are as follows:

1) Single Cell MIMO Transmission Scheme

In this example, each of a leading base station and following base stations separately determines a transmission beamforming matrix and separately selects a terminal for a service. Each base station may generate the transmission beamforming matrix based on short-term channel information associated with terminals corresponding to a corresponding base station, and may perform an operation to reduce interference applied to neighbor base stations, using long-term channel information.

2) CB Scheme

In this example, the leading base station may advertise, through a sub-band preference table, transmission beamforming matrices recommended for the following base stations. In this example, the following base stations may use the long-term channel information. The leading base station may use short-term channel information associated with terminals corresponding to the leading base station, when the leading base station generates a transmission matrix to be used by the leading base station.

The following base stations may use the transmission beamforming matrices advertised by the leading base station, and thus, may help the coordinated MIMO transmission of the leading base station. An operation of adjusting transmission beamforming matrices based on short-term channel information associated with terminals accessing the following base stations may be performed, using the transmission beamforming matrices advertised by the leading base station to prevent interference to the leading base station.

3) JP Scheme

In this example, the leading base station may generate a transmission beamforming matrices based on long-term channel information associated with terminals corresponding to the following base stations and short-term channel information associated with terminals corresponding to the leading base station. The generated beamforming matrices may be advertised to the following base stations. When the leading base station assumes that the following base stations use the transmission beamforming matrices advertised by the leading base station, the leading base station may form a new transmission beamforming matrix based on short-term channel information associated with terminals corresponding to the leading base station.

In this example, when a multi-user MIMO (MU-MIMO) is used, short-term channel information associated with the following base stations may be used in addition to the short-term channel information associated with the leading base station.

In this example, the following base stations may use the transmission beamforming matrices advertised by the leading base station in the same manner as the CB scheme, and thus, may help the coordinated MIMO transmission scheme of the leading base station. An operation of adjusting the transmission beamforming matrices based on the short-term channel information associated with the terminals corresponding to the following base stations may be performed, using the transmission beamforming matrices advertised by the leading base station to prevent interference to the leading base station.

Figure 13:
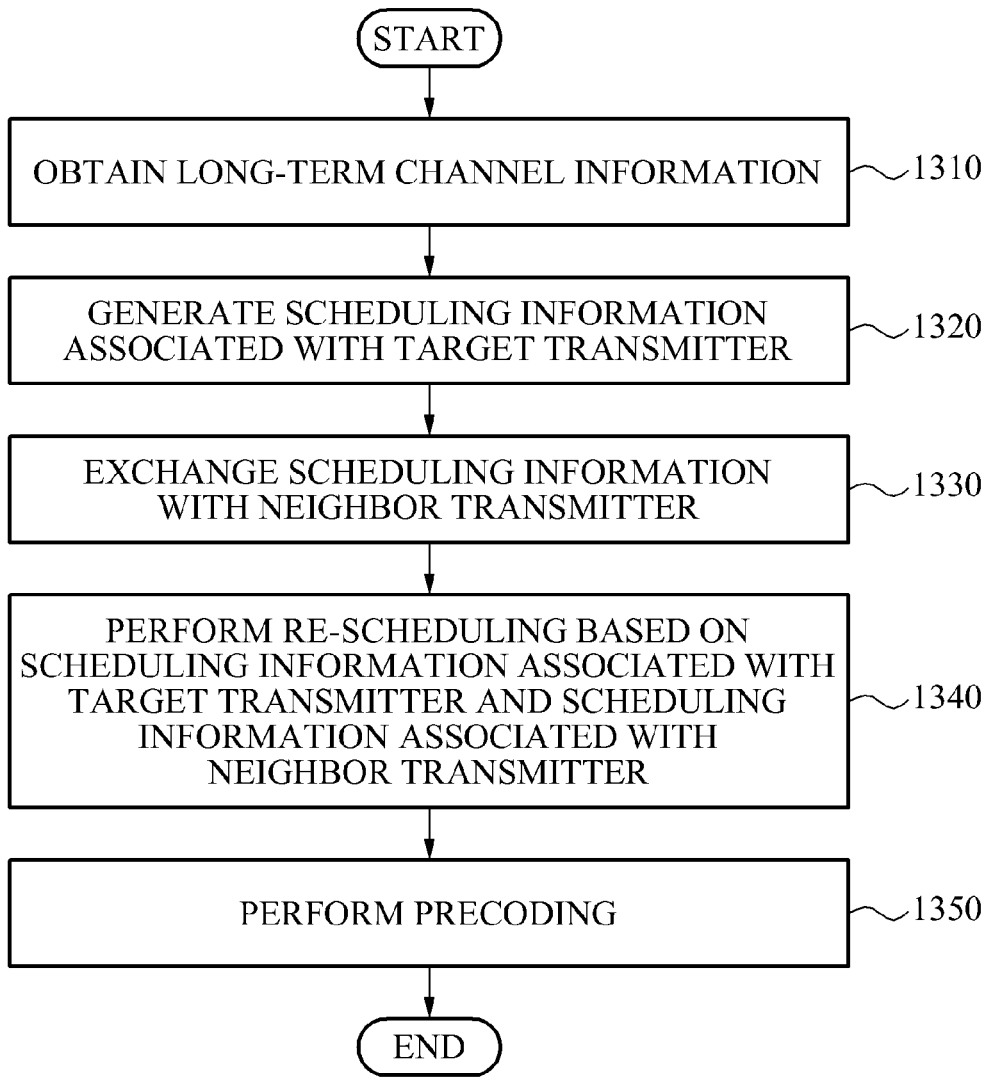
FIG. 13 is a flowchart illustrating an example of a communication method of a target base station.

FIG. 13 illustrates an example of a communication method of a target base station.

Referring to FIG. 13, the target bases station obtains long-term channel information associated with a channel between the target base station and at least one target terminal corresponding to the target base station, in 1310. The long-term channel information may correspond to channel information associated with a long-term period including at least two predetermined short-term periods.

The target base station performs scheduling with respect to each of sub-bands of the target base station based on the long-term channel information and generates scheduling information associated with the target base station, in 1320.

The target base station transmits scheduling information associated with the target base station, to at least one neighbor base station, and receives scheduling information associated with the at least one neighbor base station, in 1330. For example, the transmitting and the receiving may be based on a predetermined period.

The target base station performs re-scheduling with respect to each sub-band based on the scheduling information associated with the at least one neighbor base station received from the neighbor terminal and scheduling information associated with the target base station, in 1340.

In this example, the target base station may perform re-scheduling with respect to a leading sub-band of the target base station, based on the scheduling information associated with the target base station. The leading sub-band may denote a sub-band in which a performance metric of the target base station with respect to the corresponding sub-band is higher than performance metrics of neighbor base stations. The target base station may perform re-scheduling with respect to a following sub-band based on scheduling information associated with a neighbor base station that has the highest performance metric in the following sub-band. The following sub-band may denote a sub-band in which a performance metric of the target base station with respect to the corresponding sub-band is lower than performance metric of the at least one neighbor base station.

The target base station performs precoding based on a result of the rescheduling performed with respect to each sub-band, in 1350. In an uplink transmission, the target base station may transmit the result of the rescheduling to terminals to enable the terminals to perform uplink transmission based on the result of the rescheduling.

The target base station may update scheduling information associated with the target base station using the long-term channel information based on a predetermined period.

Figure 14:
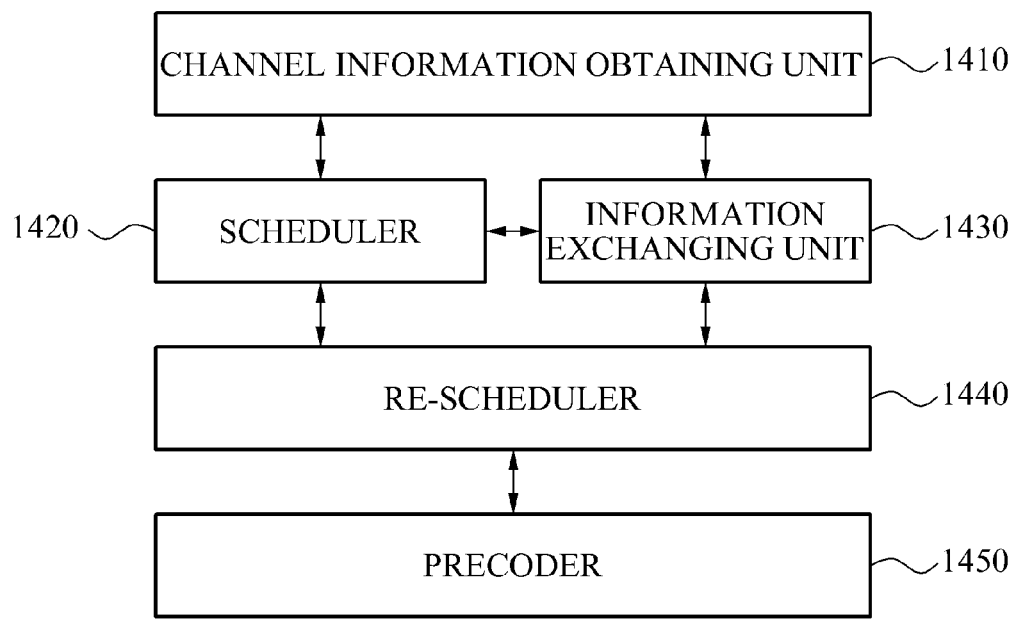
FIG. 14 is a diagram illustrating an example of a target base station.

FIG. 14 illustrates an example of a target base station.

Referring to FIG. 14, the target base station includes a channel information obtaining unit 1410, a scheduler 1420, an information exchanging unit 1430, a re-scheduler 1440, and a precoder 1450.

The channel information obtaining unit 1410 may obtain long-term channel information associated with a channel between the target base station and at least one target terminal served by the target base station. The long-term channel information may denote channel information associated with a long-term period that includes at least two predetermined short-term periods. The channel information obtaining unit 1410 may obtain short-term channel information based on a condition of a channel or based on a state of network connections between base stations.

The scheduler 1420 may generate scheduling information associated with the target base station by scheduling each sub-band of the target base station, based on the long-term channel information. The scheduler 1420 may update the scheduling information associated with the target base station using long-term channel information, based on a predetermined period.

The information exchanging unit 1430 may transmit the scheduling information associated with the target base station to at least one neighbor base station and may receive scheduling information associated with at least one neighbor base station. For example, the transmitting and the receiving may be based on a predetermined period.

The re-scheduler 1440 performs re-scheduling with respect to each sub-band, based on the scheduling information associated with the target base station and scheduling information associated with at least one neighbor base station received from the at least one neighbor base station.

The precoder 1450 may perform precoding based on a result of the re-scheduling performed with respect to each sub-band.

A communication method of a target base station and the target base station have been described. The examples described with reference to FIGS. 1 through 12 are applicable to the communication method of the target base station and the target base station of FIGS. 13 and 14, respectively. Thus, further descriptions thereof are omitted.

Although example embodiments have been described in terms of a downlink transmission, example embodiments are also applicable to an uplink transmission. In the uplink transmission, a base station performs scheduling, exchanges scheduling information with other base stations, and performs rescheduling in the same manner as the downlink transmission. It should also be appreciated that contents of channel information used during the scheduling, the channel information obtaining method, and contents of scheduling information may be changed into elements corresponding to the downlink transmission.

According to the examples herein, base stations may exchange scheduling information of each sub-band, with each other, to determine a priority among the base stations for each sub-band, and may perform rescheduling for each sub-band based on the predetermined priority to prevent network traffic from increasing in a predetermined base station. The base stations may determine a multiple-input multiple-output (MIMO) transmission scheme based on the priority, and thus, may effectively control inter-cell interference.

According to the examples herein, overhead that occurs with the exchanging of information between a base station and a terminal or between base stations may be reduced and damage due to a delay of channel information associated with a terminal may decrease, by obtaining long-term channel information.

According to the examples herein, various coordinated MIMO transmission methods may be adaptively used based on a channel condition of a terminal, and thus, a throughput of a communication system may be maximized.

According to the examples herein, frequency resources and spatial resources for coordinated MIMO transmission between adjacent base stations may be distributed by factoring in a fairness of total communication system, and thus, an effect of controlling interference may be maximized and inequality of service between base stations and inequality of service between terminals may be overcome.

The processes, functions, methods, and/or software described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

As a non-exhaustive illustration only, the terminal device described herein may refer to mobile devices such as a cellular phone, a personal digital assistant (PDA), a digital camera, a portable game console, an MP3 player, a portable/personal multimedia player (PMP), a handheld e-book, a portable laptop personal computer (PC), a global positioning system (GPS) navigation, and devices such as a desktop PC, a high definition television (HDTV), an optical disc player, a setup box, and the like, capable of wireless communication or network communication consistent with that disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer.

It should be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples embodiments have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A communication method of a target base station in a multi-cell communication system, the communication method comprising:
  obtaining long-term channel information associated with a long-term channel between the target base station and at least one target terminal served by the target base station;
  generating, based on the long-term channel information, scheduling information associated with the target base station by scheduling sub-bands of the target base station;
  transmitting scheduling information associated with the target base station to at least one neighbor base station and receiving scheduling information associated with the at least one neighbor base station, wherein the transmitting and the receiving are based on a predetermined period; and
  re-scheduling a plurality of sub-bands, the re-scheduling comprising assigning a terminal and a multiple-input multiple-output (MIMO) transmission scheme, from among a plurality of MIMO transmission schemes, to each individual sub-band, from among the plurality of sub-bands, based on the scheduling information associated with the target base station and based on the scheduling information associated with the at least one neighbor base station received from the at least one neighbor base station,
  wherein the long-term channel information is channel information associated with a long-term period that includes at least two predetermined short-term periods, and comprises at least one of information associated with a signal to interference and noise ratio (SINR) of a wideband, information associated with a correlation coefficient matrix of a transmission antenna of the target base station and a reception antenna of the at least one target terminal, information associated with channel quality information (CQI) with respect to each sub-band and information associated with a channel direction information (CDI) with respect to each sub-band, information associated with a moving speed of the at least one target terminal, and synchronization information between the at least one neighbor base station and the target base station with respect to the at least one target terminal.

2. The communication method of claim 1, wherein the obtaining comprises:
  receiving, from the at least one target terminal, the long-term channel information based on the long-term period.

3. The communication method of claim 1, wherein the obtaining comprises:
  receiving, from the at least one target terminal, short-term channel information associated with a short-term channel between the target base station and the at least one target terminal, based on a short-term period; and
  calculating the long-term channel information based on the short-term channel information received during the long-term period.

4. The communication method of claim 1, wherein the obtaining comprises:
  receiving a pilot from the at least one target terminal; and
  calculating the long-term channel information based on the pilot.

5. The communication method of claim 1, wherein the generating comprises:
  generating the scheduling information associated with the target base station, and the scheduling information comprises information associated with at least one of an index of each sub-band, a terminal group temporarily selected by the target base station for each sub-band, a transmission power allocated to each sub-band, a multiple-input multiple-output (MIMO) transmission scheme for the temporarily selected terminal group, transmission beamforming matrices recommended for the target base station and the at least one neighbor base station to provide a service to the temporarily selected terminal group based on the MIMO transmission scheme, and a performance metric associated with the terminal group temporarily selected for each sub-band.

6. The communication method of claim 1, wherein the transmitting and receiving comprise:
  transmitting, to the at least one neighbor base station, scheduling information associated with the target base station and receiving the scheduling information associated with the at least one neighbor base station, and the transmitting and the receiving are based on the long-term period including at least two predetermined short-term periods.

7. The communication method of claim 1, wherein the re-scheduling comprises:
  determining, for each sub-band, at least one of a target terminal for a service, an allocated power, a MIMO transmission scheme, and a transmission beamforming matrix, based on the scheduling information associated with the at least one neighbor base station and the scheduling information associated with the target base station.

8. The communication method of claim 1, wherein the re-scheduling comprises:
  re-scheduling a leading sub-band in which a performance metric of the target base station with respect to the corresponding band is higher than a performance metric of the at least one neighbor base station, based on the scheduling information associated with the target base station; and
  re-scheduling a following sub-band in which a performance metric of the target base station with respect to the corresponding band is lower than the performance metric of the at least one neighbor base station, based on scheduling information associated with a neighbor base station having a highest performance metric in the following sub-band.

9. The communication method of claim 8, wherein the re-scheduling based on the scheduling information that is associated with the neighbor base station having the highest performance metric comprises:
  re-scheduling the following sub-band based on the scheduling information associated with the target base station, when a MIMO transmission scheme of the neighbor base station having the highest performance metric is a single cell MIMO transmission scheme.

10. The communication method of claim 8, wherein the re-scheduling based on the scheduling information that is associated with the neighbor base station having the highest performance metric comprises:
  selecting a target terminal for a service in the following sub-band, based on a transmission beamforming matrix of the neighbor base station having the highest performance metric in the following sub-band, when a MIMO transmission scheme of the neighbor base station having the highest performance metric is a coordinated beamforming (CB) scheme.

11. The communication method of claim 8, wherein the re-scheduling based on the scheduling information that is associated with the neighbor base station having the highest performance metric comprises:
determining a transmission beamforming matrix in the following sub-band, based on a transmission beamforming matrix of the neighbor base station having the highest performance metric in the following sub-band, to transmit data to the terminal selected by the neighbor base station having the highest performance metric in the following sub-band, when an MIMO transmission scheme of the neighbor base station having the highest performance metric is a joint processing (JP) scheme.

12. The communication method of claim 1, further comprising:
performing precoding based on a result of the re-scheduling performed with respect to each sub-band.

13. The communication method of claim 1, further comprising:
updating, based on a predetermined period, the scheduling information associated with the target base station, using the long-term channel information associated with a long-term channel between the target base station and the at least one target terminal served by the target base station.

14. A target base station in a multi-cell communication system, the target base station comprising:
a channel information obtaining unit configured to obtain long-term channel information associated with a long-term channel between the target base station and at least one target terminal served by the target base station;
a scheduler configured to generate, based on the long-term channel information, scheduling information associated with the target base station by scheduling sub-bands of the target base station;
an information exchanging unit configured to transmit scheduling information associated with the target base station to at least one neighbor base station and to receive scheduling information associated with the at least one neighbor base station, based on a predetermined period; and
a re-scheduler configured to re-schedule a plurality of sub-bands, the re-scheduling comprising assigning a terminal and a multiple-input multiple-output (MIMO) transmission scheme, from among a plurality of MIMO transmission schemes, to each individual sub-band, from among the plurality of sub-bands, based on the scheduling information associated with the target base station and based on scheduling information associated with the at least one neighbor base station received from the at least one neighbor base station
wherein the long-term channel information is channel information associated with a long-term period including at least two predetermined short-term periods, and comprises at least one of information associated with a signal to interference and noise ratio (SINR) of a wide-band, information associated with a correlation coefficient matrix of a transmission antenna of the target base station and a reception antenna of the at least one target terminal, information associated with channel quality information (CQI) with respect to each sub-band and information associated with a channel direction information (CDI) with respect to each sub-band, information associated with a moving speed of at least one target terminal, and synchronization information between the at least one neighbor base station and the target base station with respect to the at least one target terminal.

15. The target base station of claim 14, wherein the scheduler generates the scheduling information associated with the target base station, and the scheduling information comprises information associated with at least one of an index of each of the sub-bands, a terminal group temporarily selected by the target base station for each sub-band, a transmission power allocated to each sub-band, a multiple input multiple output (MIMO) transmission scheme for the temporarily selected terminal group, transmission beamforming matrices recommended for the target base station and the at least one neighbor base station to provide a service to the temporarily selected terminal group based on the MIMO transmission scheme, and a performance metric associated with the terminal group temporarily selected for each sub-band.

16. The target bases station of claim 14, wherein the information exchanging unit transmits, to the at least one neighbor base station, scheduling information associated with the target base station and receives the scheduling information associated with the at least one neighbor base station, based on the long-term period including at least two predetermined short-term periods.

17. The target base station of claim 14, wherein the re-scheduler determines, for each sub-band, at least one of a target terminal for a service, an allocated power, a MIMO transmission scheme, and a transmission beamforming matrix, based on the scheduling information associated with the at least one neighbor base station and the scheduling information associated with the target base station.

18. The target base station of claim 14, wherein the re-scheduler performs re-scheduling of a leading sub-band in which a performance metric of the target base station with respect to the corresponding band is higher than a performance metric of the at least one neighbor base station, based on the scheduling information associated with the target base station, and performs re-scheduling of a following sub-band in which the performance metric of the target base station with respect to the corresponding band is lower than the performance metric of the at least one neighbor base station, based on scheduling information associated with a neighbor base station having a highest performance metric in the following sub-band.

19. The target base station of claim 14, further comprising:
a precoder to perform precoding based on a result of the re-scheduling performed with respect to each sub-band.

20. The target base station of claim 14, wherein the scheduler is configured to update, based on a predetermined period, the scheduling information associated with the target base station, using the long-term channel information associated with a long-term channel between the target base station and the at least one target terminal corresponding to the target base station.

21. The communication method of claim 1, wherein a neighboring base station, from among the at least one neighboring base stations, comprises a leading base station for respective a sub-band, and the target base station reschedules the respective sub-band based on a transmission from the leading base station for the respective sub-band.

* * * * *